April 20, 1965 C. F. SCHAEFER 3,179,868
APPARATUS FOR GENERATING THE LOCUS OF A NONLINEAR FUNCTION
Original Filed March 6, 1957 4 Sheets-Sheet 1
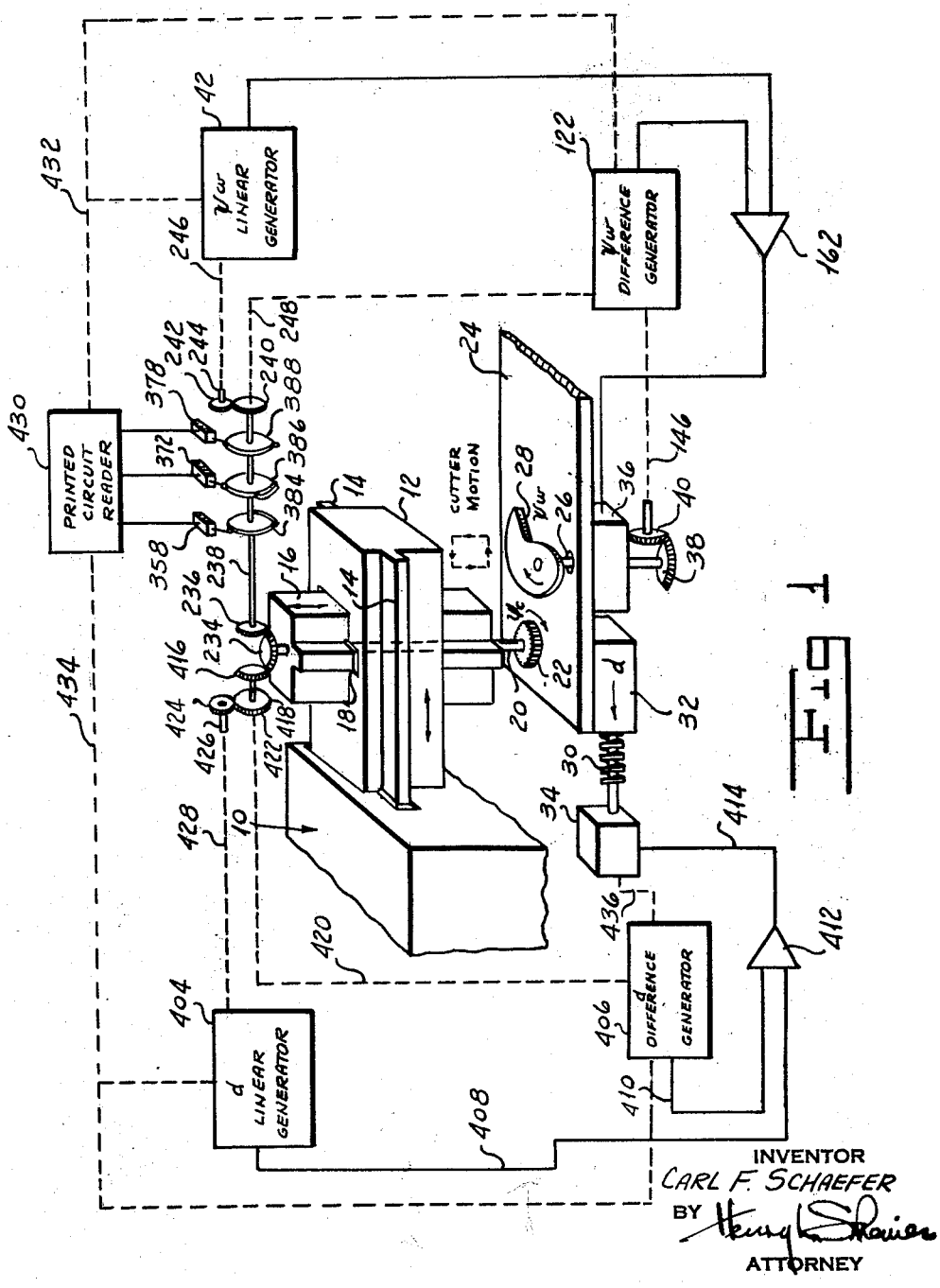
INVENTOR
CARL F. SCHAEFER
BY
ATTORNEY April 20, 1965 C. F. SCHAEFER 3,179,868
APPARATUS FOR GENERATING THE LOCUS OF A NONLINEAR FUNCTION
Original Filed March 6, 1957 4 Sheets-Sheet 2
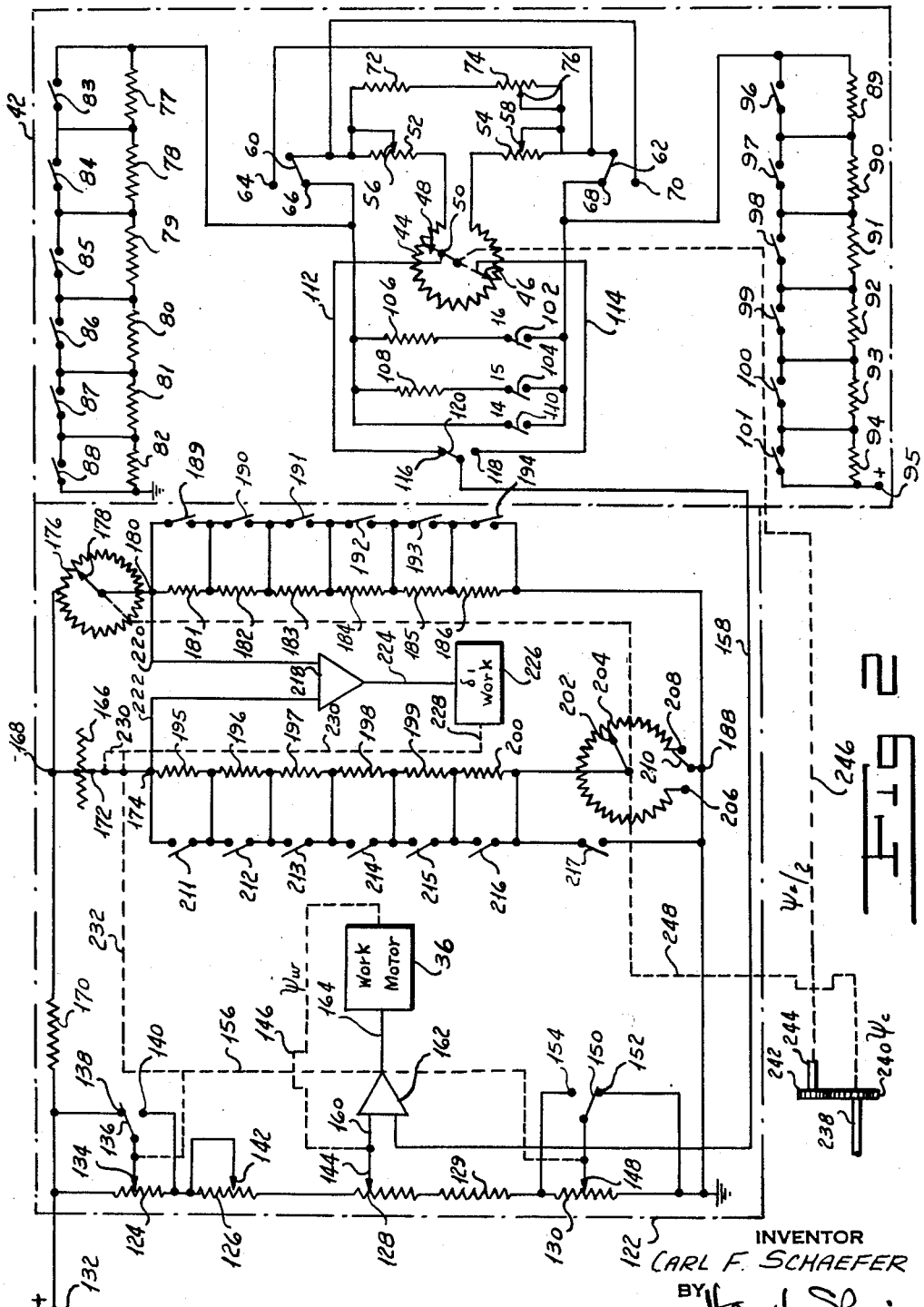
INVENTOR
CARL F. SCHAEFER
BY
ATTORNEY April 20, 1965 C. F. SCHAEFER 3,179,868
APPARATUS FOR GENERATING THE LOCUS OF A NONLINEAR FUNCTION
Original Filed March 6, 1957 4 Sheets-Sheet 3
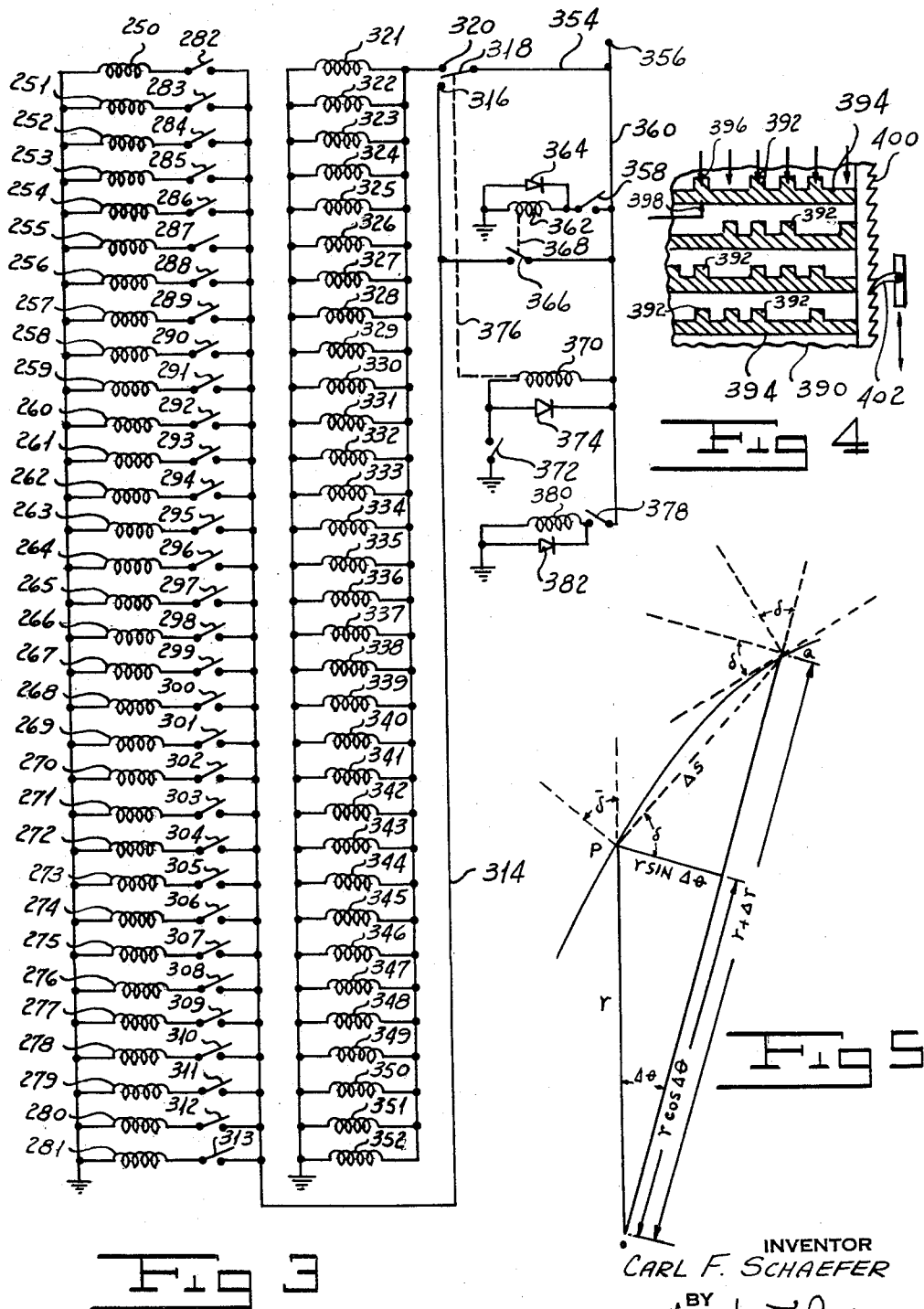

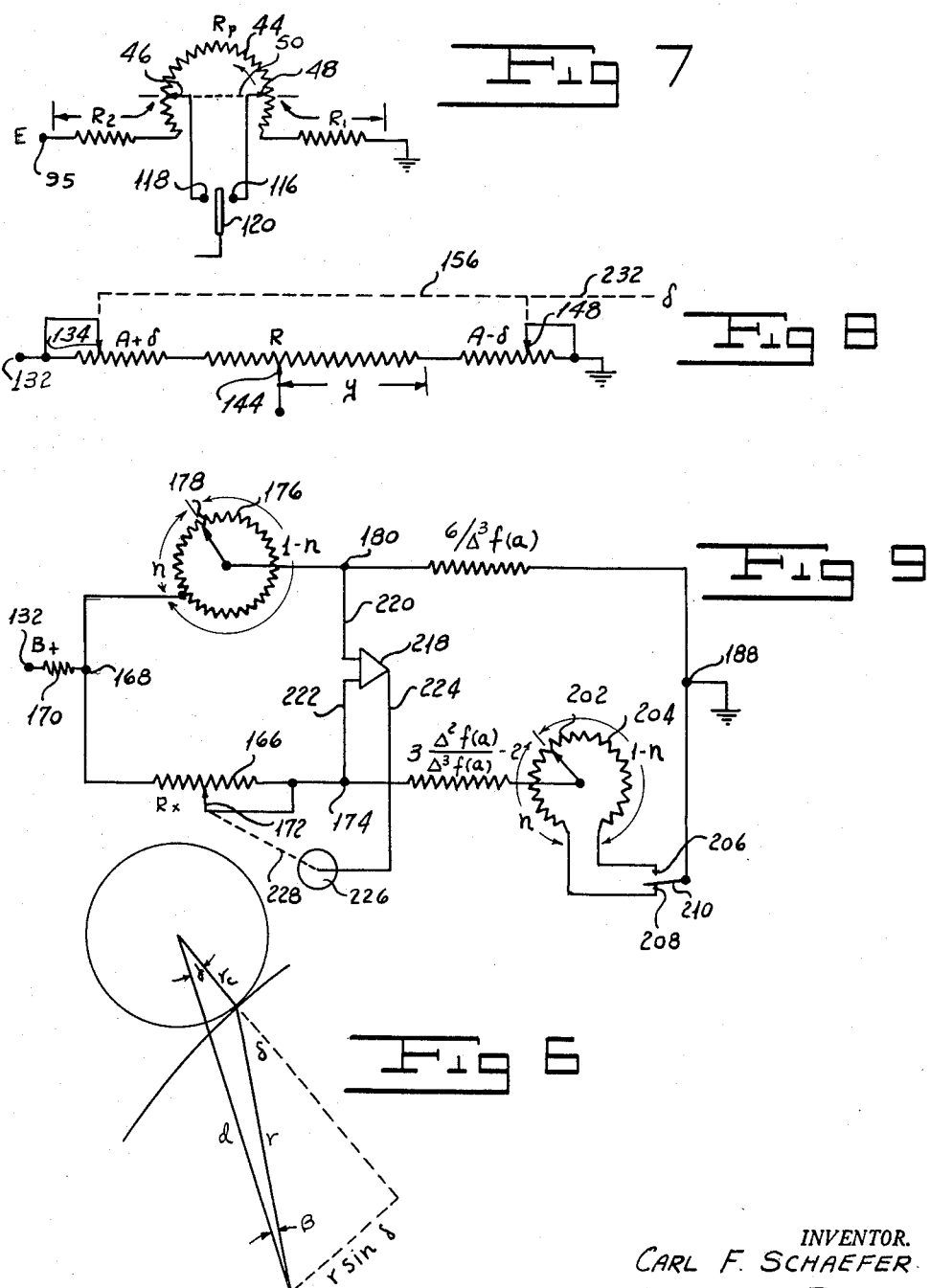

United States Patent Office 3,179,868
Patented Apr. 20, 1965

3,179,868
APPARATUS FOR GENERATING THE LOCUS
OF A NONLINEAR FUNCTION
Carl F. Schaefer, Pleasantville, N.Y., assignor to United
Aircraft Corporation, East Hartford, Conn., a corporation of Delaware
Continuation of application Ser. No. 644,404, Mar. 6,
1957. This application Dec. 7, 1960, Ser. No. 75,048
8 Claims. (Cl. 318—162)

My invention relates to a method of and apparatus for generating the locus of a nonlinear function and more particularly to a method and apparatus of the type described which are simpler and more accurate than function generating systems of the prior art. This application is a continuation of my co-pending application Serial No. 644,404, filed March 6, 1957, now abandoned.

It is often necessary to produce a motion which describes the locus of a nonlinear function. One instance in which such a motion must be produced is in the course of formation of a noncircular gear or cam on a shaping machine. If rotation of one of a pair of meshing gears is to produce a rotation of the second gear which is some function of the rotation of the first gear, a motion describing the locus of a nonlinear function must be generated in the course of formation of the gears. There are many other instances in which the locus of a nonlinear function may be required as in the formation of control cams and in computers and the like requiring electrical input signals representing the nonlinear function.

In the prior art, to control the motion of a shaping machine, for example, in accordance with a nonlinear function, a tape perforated in a pattern representative of the function is employed. The pattern of perforations in the tape corresponds to the value of the function being represented at a number of distinct points on a curve representing the function. It will be readily appreciated that if a reasonable degree of accuracy is to be achieved with the prior art systems, the value of the function being represented must be calculated at a very great number of points on the curve representing the function. In these prior art systems, extensive computations are required to achieve what is only an approximation of the function being represented.

I have invented a method for generating the locus of a nonlinear function which represents an improvement over the systems of the prior art. My method is simpler and more accurate than systems of the prior art. I have invented apparatus by means of which my method may be carried out.

One object of my invention is to provide a method for generating the locus of a nonlinear function which is simpler than systems of the prior art.

Another object of my invention is to provide a method for generating the locus of a nonlinear function which is more accurate than methods of the prior art.

A further object of my invention is to provide apparatus for generating the locus of a nonlinear function, which apparatus is simpler in construction and more accurate in operation than apparatus of the prior art.

Other and further objects of my invention will appear from the following description.

In general my invention contemplates the provision of a system for generating the locus of a nonlinear function in which I produce a first electrical signal representing a series of straight lines joining points on the curve of the function. This first signal is an approximation of the function. My system has means for producing a second electrical signal representing the function minus a signal corresponding to the error resulting from the straight line approximation provided by the first signal. I compare the first and second signals to produce an error signal. It will be apparent that the first signal and the error signal together represent the locus of the function. I employ means such as a servomotor for producing a movement corresponding to the locus.

In the accompanying drawings which form part of the instant specification and which are to be read in conjunction therewith and in which like reference numerals are used to indicate like parts in the various views:

FIGURE 1 is a schematic view of a shaping machine provided with my apparatus for generating the locus of a nonlinear function.

FIGURE 2 is a schematic view of the electrical circuit of my apparatus for generating the locus of a nonlinear function.

FIGURE 3 is a schematic view of the relay circuits of my apparatus for generating the locus of a nonlinear function.

FIGURE 4 is a fragmentary schematic view of the printed circuit reading unit of my apparatus for generating the locus of a nonlinear function.

FIGURE 5 is a diagrammatic view showing the manner in which certain of the quantities necessary in my system may be calculated.

FIGURE 6 is a diagrammatic view showing the manner in which other quantities necessary in my method may be determined.

FIGURE 7 is a schematic view of the linear generator potentiometer unit of my apparatus for generating the locus of a nonlinear function.

FIGURE 8 is a schematic view showing the portion of my apparatus which produces an electrical signal representing the function minus a correction for linear approximation.

FIGURE 9 is a schematic view of an electrical bridge employed in my apparatus for generating the locus of a nonlinear function.

In FIGURE 1 of the drawings I have shown my system as being applied to a gear shaper, indicated generally by the reference character 10. Shaper 10 has a slide 12 provided with guides 14 by means of which the slide is carried in the shaper for horizontal reciprocating movement. Slide 12 carries a vertically reciprocating ram 16 supported in the slide by guides 18. A vertical shaft 20 rotatably supported in ram 16 carries a cutter 22 for rotation with it.

Shaper 10 is provided with a table 24 which rotatably supports a shaft 26 carrying a work blank 28 on which gear teeth are to be formed. A worm 30 driven by a motor 34 threadably engages a nut or housing 32 on table 24 to move the work toward the cutter. The shaper 10 is a conventional type known in the art. In operation of the shaper, ram 16 first moves downwardly; slide 12 moves to the right as viewed in FIGURE 1 to bring the cutter 22 under the edge to be cut; ram 16 moves upwardly to perform a cutting operation; and slide 12 moves to the left to its initial position. As the cutter performs its motion, the work blank 28 slowly rotates under the action of a drive motor 36. Motor 36 drives shaft 26 carrying blank 28. A gear 38 carried by shaft 26 for rotation with it drives a gear 40 for a reason which appears hereinafter. It is to be understood that the cutter motion is relatively rapid with the result that as teeth are formed, the blank 28 slowly rotates cutter 22.

Where an irregular or noncircular gear is being formed, two variables must continuously be generated properly to form the blank. The distance $d$ between centers of the blank 28 and cutter 22 and the amount of rotation of the work blank $\psi_w$ must continuously be fed into the shaper control motors. These two quantities are related to cutter rotation $\psi_c$. From the foregoing it will be appreciated that if I feed an electrical signal proportional to the variation of $d$ with respect to cutter rotation $\psi_c$ into motor 34 and feed an electrical signal proportional to the variation of work rotation $\psi_w$ with respect to cutter rotation $\psi_c$ into motor 36, I will generate at the point of contact of the work blank 28 and the cutter 22 a non-linear function to produce a gear which, when meshing with a complementary gear, will produce the desired function.

As has been explained hereinabove, in my method I first produce an electrical signal representing a series of straight lines joining points on the curve of the function to be produced. In that order that this be accomplished, for either the distance between centers of the cutter and the work blank or for the work rotation, it is necessary that the values of both $d$ and $\psi_w$ be determined for various values of $\psi_c$. These values will, of course, depend upon the particular function to be produced. One specific case in which noncircular gears are used to generate a function is in the force ratio transducer disclosed in my copending application, Serial No. 509,844, filed May 20, 1955, now Patent No. 8,910,870. In this copending application, the driven gear of a pair of meshing noncircular gears drives a yoke carrying pivots which support a floating plate to which pressure couples are applied. The driving gear of the system is required to drive the driven gear until the yoke is at a balance point. As is explained in detail in the copending application, at balance the angle between the pivots and the line along which one couple acts may be expressed as:

(1) $$\psi = \tan^{-1}\left[\frac{P_1}{P_0}\right]$$

where $P_0$ and $P_1$ are pressures applied to the plate. In the transducer described in the copending application, the gearing from the yoke to the driver gear is in the ratio of 204 to 56. If we let $P_1 = P_t$ Pitot pressure, and $P_0 = P_s$, static pressure, from Equation 1 we may write:

(2) $$\tan \psi = \tan \frac{14}{51}\theta_2 = \frac{P_t - P_s}{P_s} = \frac{\Delta P}{P_s}$$

where $\theta_2$ is the rotation of the driver gear in radians. The ratio of a change in pressure to static pressure may be expressed in terms of Mach number M as:

(3) $$\frac{\Delta P}{P_s} = [(1+0.2M^2)^{3.5} - 1]$$

for values of M equal to or less than 1.00. For values of M equal to or greater than 1.00;

(4) $$\frac{\Delta P}{P_s} = \left[\frac{166.9216 M^2}{\left(7 - \frac{1}{M^2}\right)^{2.5}} - 1\right]$$

Substituting Equation 3 into Equation 2, we may write:

(5) $$\tan \frac{14}{51}\theta_2 = [(1+0.2M^2)^{3.5} - 1]$$

which may be reduced to the form:

(6) $$M = \sqrt{5\left(\tan \frac{14}{51}\theta_2 + 1\right)^{-3.5} - 5}$$

The conditions imposed upon the operation of the transducer described in the copending application are such that when the driven gear rotation $$\theta_1 = \frac{2\pi}{3}$$

$M = 1.0$. Similarly, when $\theta_1 = 0$, $M = 0$. From the foregoing conditions, for $M = 1.0$ we may write:

(7) $$\theta_1 = \frac{2\pi}{3}M = \frac{2\pi}{3}\sqrt{5\left(\tan \frac{14}{51}\theta_2 + 1\right)^{-3.5} - 5}$$

If the relationship expressed in Equation 7 is true at one point, it must be true at all points so that:

(8) $$\theta_1 = \frac{2\pi}{3}M$$

Substituting the expression for $$\frac{\Delta P}{P_s}$$

given by Equation 4, into Equation 2, we obtain:

(9) $$\tan \frac{14}{51}\theta_2 = \frac{166.9216 M^2}{\left(7 - \frac{1}{M^2}\right)^{2.5}} - 1$$

The conditions imposed for this expression where M is equal to or greater than 1.0 are that when $$\theta_1 = \frac{2\pi}{3}$$

$M = 1.0$, and when $\theta_1 = 2\pi$, $M = 3.0$. An examination of Equation 9 reveals that this equation cannot be solved explicitly for M. From Equation 2 we may write:

(10) $$\theta_2 = \frac{51}{14}\tan^{-1}\frac{\Delta P}{P_s}$$

While Equation 9 is insoluble explicitly for M, we may obtain corresponding values of $\theta_2$ and $\theta_1$ indirectly from Equations 10 and 8. In "Tables and Data for Computing Mach Numbers Based on the WADC 1952 Model Atmospheres," prepared by the Battelle Memorial Institute, values of $$\frac{\Delta P}{P}$$

as a function of M may be obtained. With values selected from these tables, corresponding values of $\theta_2$ and $\theta_1$ may be obtained by substituting the values from the table in Equations 8 and 10.

Where a pair of noncircular gears are to be formed, it is first necessary that the radius vectors of each gear be determined. Lockenvitz et al. in their article "Noncircular Cams and Gears," published in Machine Design, 1952, pages 141 to 145, give expressions for the respective radius vectors $r_1$ and $r_2$ of a pair of noncircular gears as:

(11) $$r_1 = \frac{C}{1 + f'(\theta_2)}$$

and

(12) $$r_2 = \frac{Cf'(\theta_2)}{1 + f'(\theta_2)}$$

where $f'(\theta_2)$ is the first derivative of $\theta_2$ expressed as a function of $\theta_1$ and C is the fixed distance between centers of rotation of the meshing gears. Values for $f'(\theta_2)$ may be determined by numerical differentiation in the table of values obtained in the manner explained hereinabove.

The remaining calculations necessary to obtain $d$ and $\psi_w$ must be made individually for each gear. Referring now to FIGURE 5, let:

O be the center of rotation of a work blank;
PQ be the arc along the locus of a gear being cut;
$r$ be the radius of the blank from O to P;
$r + \Delta r$ be the radius from O to Q;
$\Delta s$ be the chord of arc PQ;
$\delta$ be the angle between the radius $r$ and a line perpendicular to the tangent at point P;
$\bar{\delta}$ be the angle between chord $\Delta s$ and a line perpendicular to the tangent at point P;
$\Delta \theta$ be the angle between $r$ and $r + \Delta r$.

From the foregoing it can be seen that as $\Delta \theta$ approaches zero, $\bar{\delta}$ approaches $\delta$ and $\tan \bar{\delta}$ approaches $\tan \delta$. From the figure it can be seen:

(13) $$\tan \bar{\delta} = \frac{QR}{PR} = \frac{\Delta r + r(1 - \cos \Delta \theta)}{r \sin \Delta \theta}$$

This expression may be written in the form:

(14) $$\tan \bar{\delta} = \frac{\frac{\Delta r}{\Delta \theta} + r\left(\frac{1 - \cos \theta}{\theta}\right)}{r \frac{\sin \Delta \theta}{\Delta \theta}}$$

In the limiting case where $\theta=0$, Equation 14 reduces to the form:

(15) $$\tan \bar{\delta}=\tan \delta=\frac{dr}{d\theta}\bigg/r$$

Also from the figure it will be seen that:

(16) $$\Delta s = r \sin \Delta\theta / \cos\bar{\delta}$$

Dividing both sides of Equation 16 by $\Delta\theta$, we obtain:

(17) $$\frac{\Delta s}{\Delta\theta}=\frac{r \sin \Delta\theta}{\Delta\theta}\cdot\frac{1}{\cos\bar{\delta}}$$

As the limit is approached, $\cos \bar{\delta}$ approaches $\cos \delta$ and:

(18) $$\frac{ds}{d\theta}=\frac{r}{\cos\theta}$$

Referring now to FIGURE 6, I may derive expressions for the remaining quantities which must be determined. In the figure let:

$d$ be the distance between centers of the blank being cut and the cutter;
$r_c$ be the radius of the cutter;
$\gamma$ be the angle between a radius of the cutter to the point of contact between the cutter and the blank and the line representing the distance between centers of the cutter and the blank;
$B$ be the angle between the radius of the blank to the point of contact between the blank and the cutter and the line $d$.

From FIGURE 6, the following relationships may be determined:

(19) $$d=\sqrt{r_c^2+r^2-2rr_c \cos (180°-\delta)}$$

(20) $$\sin B = \frac{r_c \sin \delta}{d}$$

(21) $$\sin \gamma = \frac{r \sin \delta}{d}$$

From Equation 18:

(22) $$s=\int\frac{r}{\cos \delta}d\theta=\int r \sec \delta\, d\theta$$

We have now derived expressions for all the quantities necessary to calculate values both of $d$ and $\psi_w$ for values of $\psi_c$. From FIGURE 6 it will be appreciated that the cutter angle $\psi_c$ may be expressed as:

(23) $$\psi_c=(s/r_c)-\gamma$$

and the work rotation angle from the relationship:

(24) $$\psi_w=\theta-B$$

The calculations necessary to produce a number of values of $d$ and $\psi_w$ for equally spaced values of $\psi_c$ for the case selected may be determined in the following manner:

From Equations 8 and 10 using the tables of values of $$\frac{\Delta P}{P_s}$$

for values of $M$, a table of corresponding values of driver gear angle $\theta_1$ and driven gear angle $\theta_2$ may be calculated. From these tables by numerical differentiation the factor $f'(\theta_2)$ may be determined. By use of Equations 11 and 12 the radius vector of each gear may be found. As is explained hereinabove, the remaining calculations for each gear must be performed separately. Equation 15 gives the values of $\tan \delta$ for the selected points. The cosine and sine of $\delta$ may be determined from the calculated tangent values. Equation 19 gives values of $d$. Using the values previously determined for $d$ and sine $\delta$ and selecting a cutter radius, Equation 20 provides values of $B$. Equation 21 permits calculation of $\gamma$ values. By numerical integration in the table of calculations values of $s$ may be determined from Equation 22. Values of $\psi_c$ and $\psi_w$ may be determined from Equations 23 and 24.

When all these calculations have been completed, inverse interpolation is employed to obtain $\psi_w$ and $d$ for equally spaced values of $\psi_c$.

We now have a table of correct values of both $\psi_w$ and $d$ for equidistant values of $\psi_c$. With this table of values, we are able to interpolate between points to obtain intermediate values by use of the well-known Gregory-Newton Interpolation Formula. If we know values of $y=f(u)$ for equally spaced values of $u$ such as $u=a$, $a+w$, $a+2w$, $a+3w \ldots a+nw$, in accordance with the formula, intermediate values may be found from the expression:

(25) $$y=f(a+nw)=f(a)+\frac{n}{1!}\Delta f(a)+\frac{n(n-1)}{2!}\Delta^2 f(a)+$$
$$\frac{n(n-1)(n-2)}{3!}\Delta^3 f(a)+\ldots+n\Delta^{n-1}f(a)+\Delta^n f(a)$$

where:

$\Delta f(a)=f(a+w)-f(a)$
$\Delta^2 f(a)=f(a+2w)-2f(a+w)+f(a)$
$\Delta^3 f(a)=f(a+3w)-3f(a+2w)+3f(a+w)-f(a)$ Neglecting higher-order differences than the third, Equation 25 may be written in the form:

(26) $$y=f(a)+n\Delta f(a)+\frac{n(n-1)}{3!}\Delta^3 f(a)\left\{\frac{3\Delta^2 f(a)}{\Delta^3 f(a)}-2+n\right\}$$

Transposing the third term in the right-hand side of Equation 26, and adding a constant A to both sides of the equation, I obtain:

(27) $$y-\frac{n(n-1)}{3!}\left\{3\frac{\Delta^2 f(a)}{\Delta^3 f(a)}-2+n\right\}\Delta^3 f(a)+A=f(a)+n\Delta f(a)+A$$

Equation 27 defines the values of the function $y$ for any value of $u$ between the value $a$ and the value $(a+w)$. In other words, this equation defines the value of $y$ over the interval of $a$ to $a+w$ for $n=0$ to $n=1$. If we let $(a+w)$ have the particular value $a_1$ and define the differences as $\Delta f(a_1)$, and $\Delta^2 f(a_1)$, and $\Delta^3 f(a_1)$, we obtain an expression defining $y$ for all values of $u$ between $a_1=a+w$ and $a_2=a+2w$. From the foregoing it can be seen that the general expression for the function over any interval is expressed by:

(28) $$y-\frac{n(n-1)}{3!}\left\{3\frac{\Delta^2 f(a_k)}{\Delta^3 f(a_k)}-2+n\right\}\Delta^3 f(a_k)+A=$$
$$f(a_k)+n\Delta f(a_k)+A$$

where $\Delta f(a_k)=\Delta f(a+kw)$ and $n$ has values of zero to one. It will be appreciated that the right-hand side of Equation 28 represents a series of straight lines joining the points $f(a)+A$, $f(a_1)+A=f(a+w)+A$, $$f(a)+A=f(a+2w)+A$$

and so forth. The general equation of these straight lines is:

(29) $$f(a_k)+n\Delta f(a_k)+A=0$$

As is explained hereinabove, in my method I generate an electrical signal representing Equation 29. As can be seen by reference to FIGURES 1 and 2, for the straight line equation of $\psi_w$, I employ a linear generator 42. Generator 42 includes a potentiometer having a resistance winding 44 and a pair of brushes 46 and 48 carried at the respective ends of a rotatable arm 50. I connect respective adjusting resistors 52 and 54 provided with brushes 56 and 58 between the terminals of winding 44 and the respective contact arms 60 and 62 of a pair of relay switches including pairs of contacts 64 and 66 and 68 and 70. I connect a series circuit including a resistor 72 and a resistor 74 having an adjusting brush 76 between brushes 56 and 58. The network including resistors 52, 54, 72, and 74 provides a means for adjusting the resistance value of the potentiometer including winding 44. I connect a first plurality of series-connected resistors 77 to 82 between terminal 66 and ground. Respective relay switches 83 to 88 are connected across the respective resistors 77 to 82 and are adapted to be actuated to short-out their corresponding resistors. I connect a second plurality of series-connected resistors 89 to 94 between contact 68 and a terminal 95 of a suitable source of electrical potential. Respective relay switches 96 to 101 are connected across the respective resistors 89 to 94 and are adapted to be actuated to short-out their respective corresponding resistors. Respective normally open relay switches 102 and 104 are adapted to connect resistors 106 and 108 in parallel with the network including resistors 52, 54, 72, 74, and the resistance of winding 44. A normally open relay switch 110 is adapted to be actuated to shunt the resistance between terminals 66 and 68. I connect respective conductors 112 and 114 between the brushes 48 and 46 and the contacts 116 and 118 of a relay switch including a contact arm 120. Arm 120 is adapted to engage one of the contacts 116 or 118 to carry the output signal of generator 42 in a manner to be described.

Referring now to FIGURES 2 and 7, it will be appreciated that the resistance networks of the linear generator may be simplified and reduced to the form shown in FIGURE 7 in which the resistance $R_p$ represents the resistance between brushes 48 and 46, in which $R_1$ is the total resistance between brush 48 and ground and in which $R_2$ is the resistance between the brush 46 and terminal 95. Let us assume that the potential between terminal 95 and ground is E and that arm 120 engages contact 116. As brushes 48 and 46 rotate through an angle of 180° in a counterclockwise direction as viewed in FIGURE 7, $n$ goes fro zero to 1. I so select the values of $R_1$, $R_2$, and $R_p$ that the portion of the potential E across the portion of $R_p$ between brushes 48 and 46 represents $\Delta f(a)$. From FIGURE 7, it will be seen that this portion of the potential E may be represented as:

$$(30) \quad \frac{KR_p}{R_1+R_2+R_p} = \Delta f(a)$$

I choose the resistance values so that the portion of E across $R_1$ represents $f(a)+A$. That is:

$$(31) \quad f(a)+A = \frac{KR_1}{R_1+R_2+R_p}$$

It will be seen that as brushes 48 and 46 rotate in a counterclockwise direction as shown in FIGURE 7, the ratio of the potential $e$ at arm 120 to the total potential E may be represented as:

$$(32) \quad K\frac{e}{E} = K\frac{R_1+R_p}{R_1+R_2+R_p} = f(a)+n\Delta f(a)+A$$

When the brushes have rotated through 180° so that brush 46 has arrived at the starting point of the brush 48, $n$ has reached 1. At this point, contact arm 120 is moved to engage contact 118 and certain of the relay switches 83 to 88 and 96 to 101 are actuated in a manner to be described to give new resistance values of $R_1$ and $R_2$ corresponding to the starting point of the next interval $w$. If we let the new resistance values of $R_1$ and $R_2$ be represented as $R_{11}$ and $R_{21}$, the voltage ratio as the brushes rotate through 180° for the next interval $a_1$ will be:

$$(33) \quad K\frac{e}{E} = f(a_1)+n\Delta f(a_1)+A = K\frac{R_{11}+R_p}{R_{11}+R_{21}+R_p}$$

The process is repeated for each interval $w$ by adding series resistors to $R_1$ and $R_2$ at the beginning of each interval.

Where the curve representing the function has large changes in slope, it may be necessary to change the effective value of $R_p$ over an interval. To accomplish this, certain of the relay switches 102, 104, and 110 are actuated to place resistors in parallel with $R_p$. It will be understood further that if changes in slope of the curve occur, it becomes necessary to change the input terminals to the potentiometer network at a switching point. This is accomplished by actuating arms 60 and 62 to disengage contact 66 and contact 68 and to engage contacts 64 and 66.

From the foregoing it will be appreciated that contact arm 120 carries an electrical signal proportional to a series of straight lines connecting points on the curve of the function being represented. The relay switches are actuated in a manner to be described in accordance with the predetermined values of $\psi_w$ at the beginning of each interval to provide the proper corresponding resistance values.

As can be seen by reference to FIGURES 1 and 2, I provide a difference generator 122 for permitting a more accurate approximation of the $\psi_w$ function than is afforded by the signal produced by linear generator 42. Difference generator 122 has a series circuit including a plurality of resistors 124, 126, 128, 129, and 130 connected between a terminal 132 of a source of positive potential and ground. I connect a brush 134 associated with resistance 124 to a relay contact arm 136 adapted to engage either a contact 138 connected to terminal 132 or to engage a contact 140 connected to the terminal of resistor 124 remote from terminal 132. A brush 142 associated with resistor 126 may be actuated to short-out a predetermined portion of resistor 126. Brush 144 associated with resistor 128 is adapted to be driven from the work motor 36 through gears 38 and 40 and a linkage indicated by the reference character 146. I connect a brush 148 associated with resistor 130 to a relay contact arm 150 adapted to engage either a contact 152 connected to ground or to engage a contact 154 connected to the terminal of resistance 130 remote from ground.

Since, as is explained hereinabove, the right-hand side of Equation 27 represents a series of straight lines connecting points on the curve of the function being represented to approximate the function, it will be appreciated that the left-hand side of the equation represents the function less a correction for the linear approximation. I have so constructed the resistance network, including resistors 124, 126, 128, 129, and 130, that the potential at brush 144 represents the left-hand side of Equation 27. Let:

$$(34) \quad \delta = \frac{n(n-1)}{3!}\left\{3\frac{\Delta^2 f(a_k)}{\Delta^3 f(a_k)} - 2 + n\right\}\Delta^3 f(a_k)$$

Let us assume that contact arms 136 and 150 engage the respective contacts 138 and 152 and that potential E exists between terminal 132 and ground. As is shown in FIGURE 8, the resistance network, including resistors 124, 126, 128, 129 and 130, may be represented as three resistances in series between terminal 132 and ground in which the resistance between terminal 132 and the terminal of resistor 128 connected to resistor 126 is represented as $A+\delta$, R is the total resistance of resistors 128 and 129 and $A-\delta$ is the resistance between the terminal of resistor 129 connected to resistor 130 and ground. I select the resistance values of the resistors and drive brushes 134 and 148 proportionally to the quantity $\delta$ through a linkage 156 to give the relationship:

$$(35) \quad \frac{e'}{E} = \frac{y+A-\delta}{A+\delta+R+A-\delta} = \frac{y-\delta+A}{R+2A}$$

where $e'$ is the potential between brush 144 and ground and $y$ is the portion of the resistance R between brush 144 and the resistance $A-\delta$. I achieve this last result by driving brush 144 through linkage 146 in accordance with the value of $\psi_w$. Equation 35 may be rewritten in the form:

$$(36) \quad (R+2A)\frac{e'}{E} = y-\delta+A$$

From the foregoing it can be seen that if I let K of Equation 32 equal $R+2A$, I can compare $e$ and $e'$ to give an error signal representing the correction necessary for the linear approximation expressed in Equation 32. I accomplish this comparison by connecting arm 120 and brush 144 by respective conductors 158 and 160 to the input terminals of an amplifier 162, the output channel 164 of which provides the input signal to motor 36.

In order that the correct value of the quantity expressed in Equation 36 be generated, it is necessary that $\delta$ be determined so that the proper movement of brushes 134 and 148 may be accomplished. I employ an ordinary Wheatstone bridge to generate a signal proportional to the value of $\delta$. One arm of the bridge includes a resistor 166, the midpoint of which is connected to a first bridge terminal 168. I connect terminal 168 to terminal 132 by a resistor 170. I connect the brush 172 associated with resistor 166 to a second bridge terminal 174.

The second arm of my bridge includes a potentiometer winding 176, one point of which I connect to terminal 168. I connect the rotary brush 178 associated with potentiometer winding 176 to a third bridge terminal 180. I connect a plurality of series-connected resistors 181 to 186 between bridge terminal 180 and the fourth bridge terminal 188. Respective normally open relay switches 189 to 194 are adapted to be actuated to shunt the respective resistors 181 to 186.

The last arm of my bridge includes a plurality of resistors 195 to 200 connected in series between bridge terminal 174 and a rotary brush 202 associated with a potentiometer winding 204. The respective end terminals 206 and 208 of winding 204 are adapted to be engaged by a switch contact arm 210 connected to bridge terminal 188. Respective normally open relay switches 211 to 216 are adapted to be actuated to shunt the respective resistors 195 to 200. A normally open relay switch 217 may be actuated to shunt the potentiometer winding 204.

My Wheatstone bridge may be represented in the simplified form shown in FIGURE 9 in which resistor 166 provides the bridge with a resistance arm $R_x$. Brush 178 divides winding 176 to provide a bridge arm with parallel resistances having respective values in the ratio of $n$ to $1-n$. The switches 189 to 194 are actuated to shunt the resistors 181 to 186 to provide a third bridge arm having a resistance value of $$\frac{6}{\Delta^3 f(a)}$$

Certain of switches 211 to 216 are actuated to shunt resistors 195 to 200 to give a resistance value of $$3\frac{\Delta^2 f(a)}{\Delta^3 f(a)} - 2$$

Brush 202 divides winding 204 to provide resistances having the ratio of $n$ to $1-n$. Assuming arm 210 to be in engagement with contact 208, from ordinary Wheatstone bridge relationships it can be seen that at balance:

$$(37) \quad \frac{n(n-1)}{6/\Delta^3 f(a)} = \frac{R_x}{3\frac{\Delta^2 f(a)}{\Delta^3 f(a)} - 2 + n}$$

Solving for $R_x$, I obtain:

$$(38) \quad R_x = \frac{n(1-n)}{6}\left\{3\frac{\Delta^2 f(a)}{\Delta^3 f(a)} - 2 + n\right\}\Delta^3 f(a)$$

It will readily be seen that the value of resistor $R_x$ at balance is equal to the quantity $\delta$. Any imbalance of the bridge results in a signal between terminals 174 and 180 which I impress upon an amplifier 218 by respective conductors 220 and 222. I connect the output channel 224 of amplifier 218 to a motor 226 to produce a rotation of the motor shaft 228, which is proportional to $\delta$. A linkage 230 connects shaft 228 to brush 172, while a linkage 232 connects linkage 230 to the drive linkage 156 of brushes 134 and 136. It will be seen that motor 226 drives brushes 134, 148, and brush 172 in accordance with the value of $\delta$. In the actual circuit shown in FIGURE 2, resistor 126 provides a slope adjustment for the circuit. Resistor 129 provides a bias for the circuit. The bias provided by resistor 129 is required since the signal from the linear generator, including potentiometer winding 44, never is zero.

It may happen that the quantity to be represented by resistors 195 to 220 will be negative. If this is the case, it is necessary to modify the circuit by reducing the resistance value by one and moving arm 210 into engagement with contact 206. This results in an expression $$-\left(\frac{3\Delta^2 f(a)}{\Delta^3 f(a)} - 2 + n\right)$$

Obviously, the resistance value must be positive. In order that I may have a positive resistance value and yet obtain the proper sign, I shift switch arms 136 and 150 from contacts 138 and 152 to contacts 140 and 154. With these connections, the proper sign of the term with a positive resistance value will be given.

At a point of inflection of the function being represented, the quantity expressed by the resistors 195 to 200 lies between zero and $-1$. This situation requires a negative bridge arm resistance which is clearly impossible. I avoid this problem by selecting my intervals $w$ so that one of the values $a_n$ corresponds to the value of the function at the point of inflection. When this is done, the change in sign occurs at a switching point and the problem is avoided. It will readily be appreciated that if the third differences are insignificant, the bridge circuit can be greatly simplified.

If the function is to be correctly represented over the intervals between selected points, the potentiometer brushes 46 and 48, 178 and 202 must be driven in accordance with the variable $\psi_c$ with respect to which the values of $\psi_w$ are calculated. Referring to FIGURES 1 and 2, the cutter shaft 20 carries for rotation with it a pinion 234, which engages and drives a pinion 236 carried by a shaft 238 for rotation with the shaft 238. I select a ratio between pinions 234 and 236, such that pinion 236 makes a number of revolutions equal to the number of intervals at which values of $\psi_w$ are calculated for each revolution of pinion 234. Shaft 238 carries for rotation with it a gear 240 which drives a gear 242 fixed on a shaft 244. A suitable mechanical linkage indicated schematically at 246 drives arm 50 carrying brushes 46 and 48 from the shaft 244. Since the double brush arrangement of the potentiometer including winding 44 provides two intervals for each revolution of the brushes, I provide a two-to-one step-down ratio between gears 240 and 242. An appropriate linkage 248 provides a direct drive from shaft 238 to brushes 176 and 202.

As has been explained hereinabove, the switches of my circuit are actuated at the points between each interval to give resistance values corresponding to the value of $\psi_w$ at the points. Referring now to FIGURE 3, in order to control my relay switches, I provide a plurality of respective relay windings 250 to 281, connected in series with respective normally open switches 282 through 313. I connect the series circuits, including windings 251 to 281 and switches 282 to 313, in parallel between ground and a conductor 314 connected to one contact 316 adapted to engage contact 316 and a contact 320. I connect a plurality of respective relay holding windings 321 to 352 between contact 320 and ground. A conductor 354 connects arm 318 to the terminal 356 of a source of positive potential. A switch 358 connects a conductor 360 leading from terminal 356 to one terminal of a relay winding 362, the other terminal of which is connected to ground. A crystal or the like 364 shunts windings 362. Winding 362 when energized, actuates a linkage 368 to close a normally open switch 366 connected between conductors 360 and 314. I connect a relay winding 370 and a normally open switch 372 between conductor 360 and ground. A crystal or the like 374 shunts winding 370. Winding 370 when energized, operates a linkage 376 to move arm 318 out of its normal engagement with contact 320 and into engagement with contact 316. I connect a switch 378 in series with a winding 380 between conductor 360 and ground. A crystal 382 shunts winding 380. Switches 358, 372, 378 are actuated by respective cams 384, 386, and 388 carried by shaft 238 for rotation with it.

At the start of each interval $w$, certain of the switches 282 to 313 are closed in accordance with the value of the function $\psi_w$ at the starting point in the interval. As the cutting progresses from point to point, the switches are closed in accordance with a predetermined pattern. This may be accomplished by any convenient means. For example, referring to FIGURE 4, a member 390 carrying a plurality of rows of conducting segments 392 may be employed. The segments of each row are connected to a conducting strip 394. Each of switches 282 to 313 may include a brush 396 adapted to engage a segment 392 carried by member 390 in any position of the member 390. I so arrange the segments of the respective rows that certain brushes 396 engage segments 392 while others of the brushes do not. A brush 398 is adapted to engage the conducting strip 394 associated with a row of segments 392 in any position of the member 390. If a brush 396 engages a segment 392, the circuit of the associated winding is completed through brush 398 which engages strip 394. Since, in the form of my invention shown, I have provided thirty-two relay windings and associated switches, I provide thirty-two brushes 396. As many rows of segments 392 are provided as there are intervals $w$. For example, if I wish to divide a revolution of the cutter into eighteen-degree intervals, there will be twenty rows. As has been explained hereinabove, the pattern of each row is determined by the value of the function at a point on the curve of the function. Any convenient means such as a ratchet 400 carried by member 390 and a pawl 402 actuated by solenoid winding 380 may be employed to step member 390 to the next position at the end of an interval.

From the system thus far described, it will be seen that I have produced an electrical signal which accurately represents the relationship between the nonlinear function $\psi_w$ and $\psi_c$. The linear generator 42 produces an electrical signal representing a series of straight lines connecting points on the curve of $\psi_w$ versus $\psi_c$. The difference generator 122 provides an electrical signal which when compared with the signal from generator 42 produces an error signal which is fed to motor 36 to rotate the work blank 28 in accordance with the function $\psi_w$. In the example of my method and apparatus shown, in order that the gear blank 28 be properly formed, it is also necessary that the variation of the distance $d$ between centers of the cutter and work with respect to cutter rotation be produced. This may be accomplished in exactly the same manner as was done for $\psi_w$. A pattern of rows of segments such as segments 392 may be set up in accordance with the values of $d$ at the points defining the selected intervals of $\psi_c$. Relays actuated in accordance with this pattern operate switches of the linear generator 404 for $d$. Correction over the interval is produced by a difference generator 406 similar to generator 122. Respective output channels 408 and 410 conduct the output signals from generators 404 and 406 to an amplifier 412, the output channel 414 of which feeds motor 34. Pinion 234 carried by shaft 20 engages and drives a pinion 416 carried by a shaft 418 for rotaiton with it. A linkage 420 provides a connection between the shaft 418 and generator 406. A gear 422 carried by shaft 418 for rotation with it, drives a gear 424 fixed on a shaft 426. A linkage 428 provides an input from shaft 426 to linear generator 404. It is to be understood that one rotation of gear 234 produces a number of rotations of bevel gear 416 equal to the number of intervals selected. Gears 422 and 424 provide a two-to-one step-down between shaft 418 and shaft 426. The respective mechanical connections between the printed circuit reader 430, including relay windings 250 to 281, switches 282 to 313, and holding windings 321 to 352, and the generators 42, 122, 404, and 406, are indicated schematically at 432 and 434. A linkage 436 provides a mechanical feedback from motor 34 to difference generator 406.

In the practice of my method of generating the locus of a nonlinear function, I first calculate the values of the function to be represented at points equally spaced along one axis of a plot of the function. For example, where a noncircular gear is to be cut, I calculate the values of work rotation $\psi_w$ and of the distance between centers of the cutter and work blank for equally spaced values of cutter rotation $\psi_c$. I accomplish this in the manner described hereinabove using the relationships set forth in Equations 1 through 24. After having calculated the necessary values, I generate an electrical signal representing a number of straight lines connecting the points on the curve of the $\psi_w$ or $d$ function at which values were calculated. I accomplish this result by means of a linear generator 42 or 404. The generator resistance values corresponding to the calculated values of the function are determined in accordance with the relationship set forth in Equation 32. The pattern of segments or the like 392 in the printed circuit reader 430 is arranged so that in a position of the member 390 corresponding to a point on curve of the function, certain of the relay windings 250 to 281 are energized to produce a linear generator resistance value which results in a signal proportional to the calculated function value at the point. As the member 390 is stepped by operation of switch 378 in response to cutter rotation, signals corresponding to the calculated values of the function are produced. My linear generator also produces a linear approximation of the function over the intervals between calculated values.

In order to represent the function more accurately, I generate an electrical signal which is proportional to the value of the function minus a correction for an approximation of the linear generator 42 or 404. This I accomplish by using a difference generator 122 or 406. The resistance values of the generator corresponding to the values of the function at the calculated points are determined in accordance with the relationship set forth in Equation 36. The bridge including potentiometer windings 176 and 204 produces a difference signal in accordance with Equation 38 to drive the brushes 134 and 148 to give the relationship of Equation 36.

After generating the signal representing the linear approximation and the signal representing the function minus a correction for linear approximation, I compare these two signals in the amplifier 162 or 412 to produce an error signal. I feed the error signal to the work rotation motor 36 or to the table movement motor 34 depending upon the function being generated.

As a result of the operation described above, motor 34 vaires distance $d$ and motor 36 varies the work rotation $\psi_w$ in accordance with the contour of the gear being cut. As the shaper 10 performs its operations, the cutter 22 rotates through an angle $\psi_c$ to produce the proper input for the linear generators 42 and 404 and for the difference generators 122 and 406.

As has been explained hereinabove, the printed circuit reader 430 including the relay windings for actuating the switches of the linear generators and difference generators in accordance with the preset pattern is controlled by cams 384, 386 and 388 on shaft 238, which is driven through a number of revolutions equal to the number of intervals selected for each revolution of the cutter. Referring to FIGURES 1 and 3, in operation of the circuit reader, just before the beginning of an interval, arm 318 engages contact 320 to energize the holding windings 321 to 352. These windings maintain closed the associated generator switches which were closed at the beginning of the preceding interval. At the same time certain of reader switches 282 to 313 corresponding to the value of work rotation for the next interval are closed. To being the next interval cam 386 closes switch 372 to energize winding 370 to move arm 318 to engage contact 316 to deenergize the holding windings and to energize the windings 250 to 281 whose associated reader switches are closed. Before the cam 386 permits winding 370 to be deenergized, cam 384 closes switch 358 to energize winding 362 to close switch 366. With switch 366 closed, switch 372 opens to deenergize winding 370 to permit arm 318 to engage contact 320 to complete the circuit of relay hold windings, which, as explained hereinabove, keep closed those switches which were closed at the beginning of the interval. When cam 388 actuates switch 378, solenoid 380 is energized to step the member 390. This operation is repeated over the number of selected intervals to actuate the linear generator and difference generator to cause them to produce the electrical signals which are compared to produce the function representation in the manner described hereinabove.

From the foregoing it will be seen that in the specific form of my apparatus shown I produce a first electrical signal representing a linear approximation of the function and a second electrical signal representing the function less a correction for the linear approximation. I compare the two signals to produce an error signal representing the error in the function. I apply this error signal to, for example, the work rotation motor 36, to correct the function, work rotation, to reduce the error signal to zero. As the error signal is continuously generated, the function is continuously corrected.

It is to be understood that I may, if desired, employ other arrangement within the scope of my invention. I may, for example, add the difference signal produced by the bridge of the difference generator to the linear approximation and compare the added signals with the function to produce an error signal for correcting the function value.

While I have described an example of the use of my method and apparatus in which noncircular gears are being cut, it is to be understood that my method and apparatus are of general applications. They may be employed in any case in which the locus of a nonlinear function is to be generated. In each case a signal representing a series of straight lines connecting points on the curve of the function and a signal representing the function less a correction for the linear approximation are generated. These signals are compared to produce an error signal, the variation of which represents the variation of the function.

It will readily be appreciated from the foregoing description that in interpolating between a pair of adjacent points on a curve of the function my apparatus "looks at" not only the values at the two points between which the interpolating operation takes place but it considers at least the first and second and third discrete values of four consecutive values in interpolating between the first and second points. This fact will be apparent from Equations 26 and 27 and from the definitions $\Delta^2 f(a)$ and $\Delta^3 f(a)$ above. Thus my apparatus provides signals which are an accurate representation of the function.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described by invention, what I claim is:

1. Apparatus for generating an electrical signal representing the locus of a nonlinear function of a variable including in combination first generating means for producing a first electrical signal representing a series of linear approximations of said function between predetermined values of said function for selected values of said variable, means for driving said first generating means in accordance with changes in said variable, means for actuating said first generating means in accordance with said predetermined values to produce said first electrical signal, second generating means for producing a second electrical signal representing said function less a correction for said linear approximations, means for driving said second generating means in accordance with changes in said variable, means for actuating said second generating means in accordance with said predetermined function values and means for comparing said first and second signals to produce a signal representing the correction for said linear approximation, said first generating means including a series circuit comprising a first impedance and a second impedance and a third impedance, pick-off means movable along said second impedance and means for applying a potential to said circuit, said actuating means for said first generating means including means for settling said first and third impedances to predetermined values to produce a potential across said third impedance representing one of said predetermined function values, said means for driving said first generating means including means for moving said pick-off means along said second impedance, whereby said pick-off means carries a signal representing a linear approximation of said function over an interval between said one predetermined function value and a succeeding function value.

2. Apparatus for generating an electrical signal representing the locus of a nonlinear function of a variable including in combination first generating means for producing a first electrical signal representing a series of linear approximations of said function between predetermined values of said function for selected values of a variable, means for driving said first generating means in accordance with changes in said variable, means for actuating said first generating means in accordance with said predetermined values to produce said first electrical signal, second generating means for producing a second electrical signal representing said function less a correction for said linear approximations, means for driving said second generating means in accordance with changes in said variable, means for actuating said second generating means in accordance with said predetermined function values and means for comparing said first and second signals to produce a signal representing the correction for said linear approximation, said first generating means including a series circuit comprising a first resistance and a second resistance and a third resistance, means for applying a potential to said series circuit, and means for picking a potential off said second resistance, said pick-off means being movable along said second resistance to pick off a potential including the potential across said third resistance plus any part of the potential across said second resistance, said means for actuating said first generating means including means for setting said first and third resistances to predetermined values to produce a potential across said third resistance representing one of said predetermined function values, said means for driving said first generating means including means for driving said pick-off means whereby said pick-off means carries a signal representing a linear approximation of said function over an interval between said one predetermined function value and a succeeding function value, said means for actuating said first generating means including means for changing said first and third resistance values to produce a potential across said third resistance representing said succeeding value when said pick-off signal reaches a value corresponding to said succeeding value and means for resetting said pick-off means concomitantly with the changing of the first and third resistance values and in which said means for driving said first generating means again drives said pick-off means whereby said pick-off means carries a signal representing a second linear approximation of said function over the interval between said succeeding value and a second succeeding function value.

3. Apparatus for generating an electrical signal representing the locus of a nonlinear function of a variable including in combination first generating means for producing a first electrical signal representing a series of linear approximations of said function between predetermined values of said function for selected values of a variable, means for driving said first generating means in accordance with changes in said variable, means for actuating said first generating means in accordance with said predetermined values to produce said first electrical signal, second generating means for producing a second electrical signal representing said function less a correction for said linear approximations, means for driving said second generating means in accordance with changes in said variable, means for actuating said second generating means in accordance with said predetermined function values and means for comparing said first and second signals to produce a signal representing the correction for said linear approximation, said first generating means including a series circuit comprising a first resistance and a potentiometer resistance and a third resistance, a pair of brushes movable along said potentiometer in succession, a circuit element actuatable alternately to be connected first to one and then to the other of said brushes, and means for applying a potential to said circuit, said actuating means for said first generating means including means for setting said first and third resistances to predetermined values to produce a potential across said third resistance representing one of said predetermined function values, said means for driving said first generating means including means for driving said brushes along said potentiometer resistance whereby one of said brushes carries a signal representing a linear approximation of said function over an interval between said one predetermined value and a succeeding function value, said means for actuating said first generating means including means for actuating said circuit element to connect the element to said one brush, means for changing said first and third resistance values to produce a potential representing said succeeding function value when said one brush carries a potential representing said succeeding value and means for actuating said circuit element to connect the element to the other of said brushes concomitantly with the operation of the resistance value changing means.

4. Apparatus for generating an electrical signal representing the locus of a nonlinear function of a variable including in combination first generating means for producing a first electrical signal representing a series of linear approximations of said function between predetermined values of said function for selected values of a variable, means for driving said first generating means in accordance with changes in said variable, means for actuating said first generating means in accordance with said predetermined values to produce said first electrical signal, second generating means for producing a second electrical signal representing said function less a correction for said linear approximations, means for driving said second generating means in accordance with changes in said variable, means for actuating said second generating means in accordance with said predetermined function values and means for comparing said first and second signals to produce a signal representing the correction for said linear approximation, said second generating means comprising a series circuit including a first impedance and a variable impedance, means for applying a potential to said series circuit, pick-off means movable along said first impedance, means for generating an electrical signal representing the deviation of said function from said linear approximations, means responsive to said deviation signal for varying said variable impedance and means responsive to said correction signal for driving said pick-off means whereby said pick-off means carries said correction signal.

5. Apparatus for generating an electrical signal representing the locus of a nonlinear function of a variable including in combination first generating means for producing a first electrical signal representing a series of linear approximations of said function between predetermined values of said function for selected values of a variable, means for driving said first generating means in accordance with changes in said variable, means for actuating said first generating means in accordance with said predetermined values to produce said first electrical signal, second generating means for producing a second electrical signal representing said function less a correction for said linear approximations, means for driving said second generating means in accordance with changes in said variable, means for actuating said second generating means in accordance with said predetermined function values and means for comparing said first and second signals to produce a signal representing the correction for said linear approximation, said second generating means comprising a series circuit including a potentiometer resistance and a variable resistance, means for applying a potential to said series circuit, pick-off means movable along said potentiometer resistance, a bridge network having a first arm comprising a first potentiometer, a second arm comprising a first resistance, a third arm comprising a second resistance and a second potentiometer connected in series, and a fourth arm comprising a variable balancing resistance, said means for actuating said second generating means setting said first and second bridge resistances to values determined by the deviation of said function from said linear approximation, said means for driving said second generating means comprising means for driving said first and second bridge potentiometers whereby said bridge produces a signal representing the deviation of said function from the straight line approximation and in which said second generating means comprises means responsive to said signal for driving said balance arm and said pick-off means.

6. Apparatus for generating an electrical signal representing the locus of a nonlinear function of a variable including in combination first generating means for producing a first electrical signal representing a series of linear approximations of said function between predetermined values of said function for selected values of a variable, means for driving said first generating means in accordance with changes in said variable, means for actuating said first generating means in accordance with said predetermined values to produce said first electrical signal, second generating means for producing a second electrical signal representing said function less a correction for said linear approximations, means for driving said second generating means in accordance with changes in said variable, means for actuating said second generating means in accordance with said predetermined function values and means for comparing said first and second signals to produce a signal representing the correction for said linear approximation, said first generating means comprising an impedance network and a plurality of switches adapted to be actuated to vary the impedance of said network, said means for actuating said first generating means comprising a plurality of relay windings, a plurality of circuits for said windings, means for conditioning certain of said circuits to be completed, means for completing said circuits, holding means for said switches, means for energizing said holding means and means for stepping said conditioning means.

7. Apparatus for providing a continuous output representing a nonlinear function including in combination means for providing four consecutive and discrete values of the function, means responsive to the first and second and third discrete values for providing a first continuous output representing the function from the first value to the second value, and means responsive to the second and third and fourth discrete values for providing a second continuous output representing the function from the second value to the third value, the transition between said first and second outputs occurring at said second discrete value of said function.

8. Apparatus for providing a continuous output representing a nonlinear function including in combination means for providing five consecutive and discrete values of the function, means responsive to the first and second and third and fourth discrete values for providing a continuous output representing the function from the first value to the second value and means responsive to the second and third and fourth and fifth discrete values for providing a continuous output representing the function from the second value to the third value.

References Cited by the Examiner

UNITED STATES PATENTS

| | | | |
|---|---|---|---|
| 2,773,222 | 12/56 | Chauvin | 317—149 |
| 2,799,812 | 7/57 | Shively | 317—149 |
| 2,887,638 | 5/59 | Cail et al. | 318—162 X |
| 2,900,586 | 8/59 | Spencer et al. | 318—162 |
| 2,917,693 | 12/59 | Cail | 318—162 |
| 2,944,737 | 7/60 | Cail et al. | 235—151 |
| 3,066,868 | 12/62 | Tripp | 235—151 |

ORIS L. RADER, *Primary Examiner.*

MILTON O. HIRSHFIELD, *Examiner.*